Dec. 27, 1949     F. L. RUPLEY     2,492,656
AIR GAUGE
Filed June 13, 1946                                          2 Sheets-Sheet 1
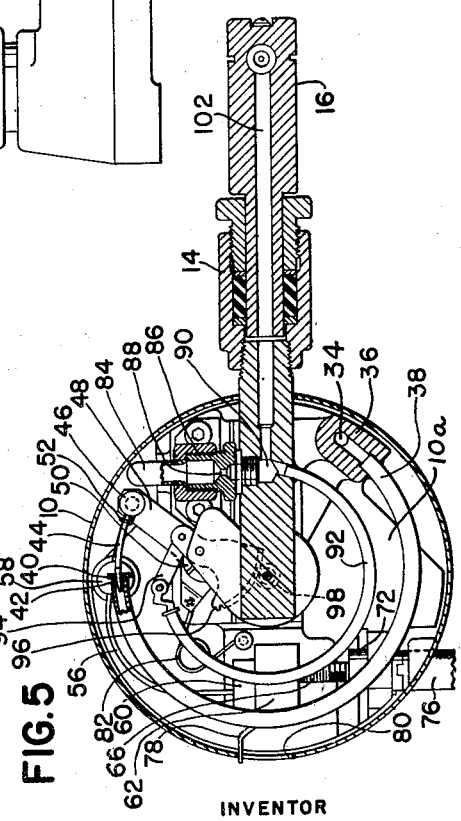
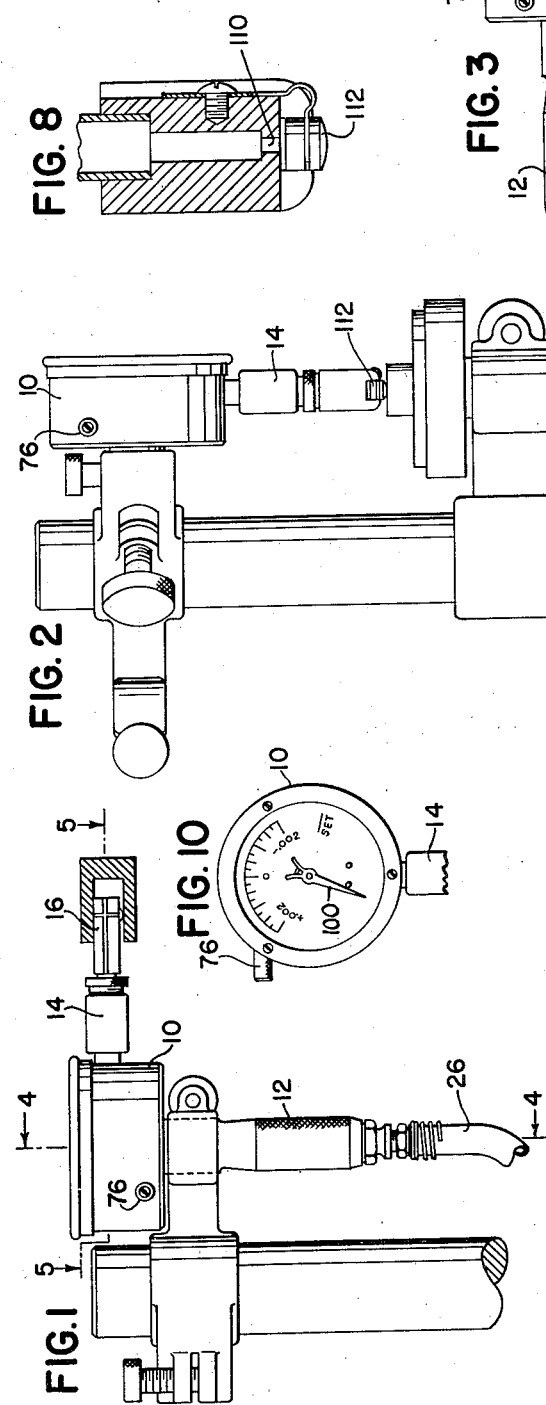
INVENTOR
FREDERICK L. RUPLEY
BY
Toulmin & Toulmin
ATTORNEYS Dec. 27, 1949     F. L. RUPLEY     2,492,656
AIR GAUGE
Filed June 13, 1946     2 Sheets-Sheet 2
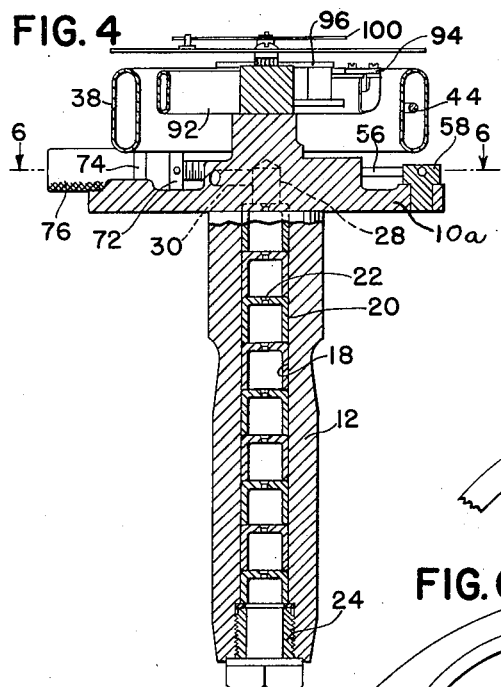
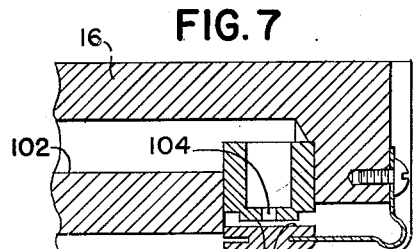
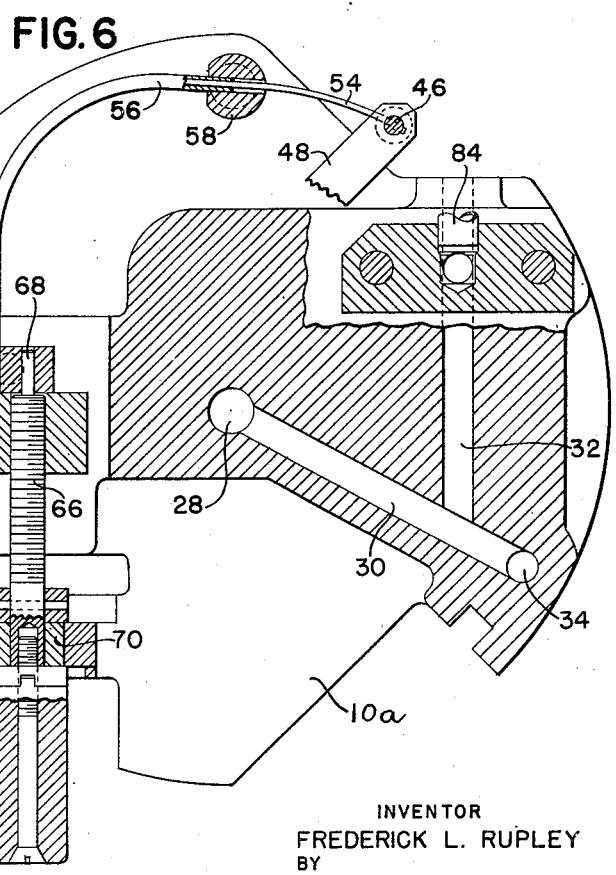
INVENTOR
FREDERICK L. RUPLEY
BY
Toulmin & Toulmin
ATTORNEYS Patented Dec. 27, 1949

2,492,656

UNITED STATES PATENT OFFICE 2,492,656

AIR GAUGE

Frederick L. Rupley, Cincinnati, Ohio, assignor to Merz Engineering Company, Indianapolis, Ind., a corporation of Indiana Application June 13, 1946, Serial No. 676,541

13 Claims. (Cl. 33—178)

1

This invention relates to air gauges and particularly to air gauges employing an elastic fluid medium such as compressed air, and which are adapted for a plurality of uses.

The principal object of the present invention is to provide a more compact and more versatile gauge for use in garages and shops and in other instances wherein it is desired to have a highly accurate and readily portable measuring instrument.

Another object is to provide a measuring instrument of the type employing compressed air which is readily adjustable to accommodate the gauge to all circumstances and without materially affecting the accuracy thereof.

Still another object is to provide an air gauge adapted for fixed or manual operation and in which the gauging head is readily replaceable whereby the gauge may be employed in a plurality of situations and for a wide variety of workpieces.

These and other objects and advantages become more apparent upon reference to the following specification taken together with the accompanying drawings in which:

Figure 1 is an elevational view of a gauge according to the present invention being used as a fixed arbor gauge;

Figure 2 is another view of the gauge of this invention and shows it clamped on a column and being used as a height gauge;

Figure 3 is still another view showing the gauge being used as a manual gauge for measuring the diameter of a bore in a workpiece;

Figure 4 is a vertical section through the gauge and is indicated through the line 4—4 in Figure 1;

Figure 5 is a transverse section through the gauge and is indicated by the line 5—5 on Figure 1;

Figure 6 is a somewhat enlarged sectional view and is indicated by the line 6—6 on Figure 4;

Figure 7 is a detailed view showing the type of gauge head illustrated in Figure 1;

Figure 8 is a detailed view showing the type of gauge head employed in Figure 2;

Figure 9 is an enlarged view showing the tapered metering pin more in detail; and Figure 10 is a front elevation showing the graduated dial of the instrument.

General arrangement

According to this invention compressed air at a controlled pressure is supplied to the gauge. As the air passes into the gauge it is conducted

2 through a series of alternate orifices and expansion chambers by means of which moisture and dirt particles are precipitated from the gas stream and the temperature thereof is made substantially uniform due to the chilling action which occurs in the expansion chambers.

After the gas leaves the last expansion chamber it passes to a gauging port which is variable by a gauging member that is actuated by the workpiece being measured. The actuation of the gauging member by the workpiece is effective to vary the rate of fluid flow through the gauging orifice. Between the gauging orifice and the expansion chambers there is located a fixed or master orifice and between the master orifice and the gauging port, there is connected a pressure responsive indicating instrument such as Bourdon tube type gauge. The variable pressure between the master orifice and the gauging port is indicated by the aforementioned gauge, and the gauge may be graduated in fractions of an inch above and below a predetermined workpiece size and the gauged workpiece thereby checked against a standard.

Connected between the expansion chambers and the master orifice is a bypass port which is variable directly in accordance with the pressure therein. Preferably, this arrangement consists of a second Bourdon tube substantially concentric with the first having its fixed end communicating with the space between the expansion chambers and the master orifice, and having its free end provided with an orifice plate into which extends a tapered metering pin. When the Bourdon tube yields due to an increasing pressure therein, the orifice plate moves relative to the tapered metering pin and varies the rate of discharge of fluid from the said tube. In this manner the pressure of the fluid supplied to the master orifice is substantially constant and the pressure indicated by the pressure gauge may be made to fall within the relatively close limits.

The aforementioned arrangement provides that when the gauging port is completely closed, the pressure indicator will rise only to a predetermined point which may be called the "set point" of the instrument. By means of the "set point," the calibration of the gauge may be checked at any time and it is unnecessary to employ auxiliary standards or masters in order to be certain that the air gauge is giving proper indications.

Structural arrangement

Referring to the drawings, a gauge according to this invention comprises a frame or casing 10 which houses the pressure indicating gauge and the bypass port. Extending from the back of the gauge is a shank or handle 12 by means of which the gauge can be manipulated manually or be clamped in a suitable stationary fixture. Extending from the side of the device is a gauge head receiving fitting indicated at 14 within which is mounted the gauge head 16.

Referring to Figure 4, it will be noted that the shank or handle 12 is provided with a bore 18 within which is a plurality of restrictor members 20, each of which consists of a cup-shaped part having an orifice 22 in the lower wall thereof. The restrictor members are clamped in the bore 18 as by the fitting 24, and air under pressure is supplied to the said restrictors by the flexible conduit 26 which is connected with the fitting 24.

The uppermost of the restrictor members 18 opens into a channel 28 in the back plate 10a of the casing 10 as indicated in Figures 4, 5 and 6. The bore 28 communicates with a horizontal bore 30 which is intersected by a second horizontal bore 32 and a vertical bore 34, all of which lie in the said back plate 10a of the casing 10.

The bore 34 leads upwardly into a boss portion 36 Figure 5 and communicates with the fixed end of a Bourdon tube 38. The tube 38 is curved to lie within the casing 10 and terminates in an aperture plate as at 40.

Extending into the aperture 42 of the aperture plate 40 is a tapered metering pin 44 which is pivoted as at 46 to the arm 48. The arm 48 is, in turn, pivoted at 50 to the aforementioned back plate 10a of the casing 10. In response to the variations of the pressure in the tube 38, the effective area of the port 42 is varied due to the yielding of the said tube.

In order to prevent the metering pin 44 from fluttering from one side of the port 42 to the other, there is provided a torsion spring indicated at 52 which continuously urges the said metering pin toward one side of the said port.

To provide for an initial adjustment of the metering pin relative to the orifice 42 in the end of the Bourdon tube 38, the arm 48 is angularly adjustable. This is accomplished by the arrangement shown in Figures 5 and 6. The pivot pin for the metering pin 44 extends through the arm 48 and has connected therewith the end of a wire 54. This wire passes into the end of a tube 56 which is carried on the back plate portion 10a of the casing 10 between the stud 58 and the lug 60 both of which are stationary. The wire 54 comes out of the end of the tube at the block 60 and extends through a movable block 62 and is retained therein by the set screws 64.

The movable block 62 has a threaded bore therein which receives the screw 66 which has a pilot end 68 extending into a suitable bore in the block 60. The other end of the screw 66 passes through a stationary collar 70 and is retained against axial movement by the collar 72 pinned to the screw on one side of the stationary collar 70 and by the head portion 74 on the other side of the said stationary collar. The screw is adjustable in rotation by the knurled fitting 76 that is secured to the said screw and extends outside of the casing 10.

In order to prevent adjustment of the movable block 62 beyond predetermined limits, there is a stop 78 secured thereto which extends to a slot 80 in the casing 10 and abuts the ends of the said slot when the limits of movement have been reached.

In order continuously to urge the arm 48 in a clockwise direction as viewed in Figures 5 and 6, there is a torsion spring 82 extending between the said arm and a stationary point. By this means the wire 54 is continuously in tension and there is no possibility of the buckling thereof which would necessitate dismantling the instrument.

The air which passes through the bore 32 is conducted by a pipe 84 upwardly and passes through a fitting indicated at 86 which comprises a fixed orifice 88. The orifice 88 is of a predetermined and exact size and may be termed the master orifice for the instrument.

The air which passes through the master orifice is conducted to the bore 90 in the supporting column of a Bourdon tube type pressure gauge. This gauge comprises the Bourdon tube 92 which has its fixed end in communication with the bore 90 and its movable end connected by a drag link 94 with a gear sector 96 which is in mesh with the pinion 98 which is connected with the shaft of the instrument pointer 100.

The bore 90 also communicates with the bore 102 in the gauge head 16. The bore 102, on reference to Figure 7, will be seen to terminate in a gauging orifice 104 which is adapted for being variably restricted by a member 106 which may be called a gauging button. The member in which the orifice 104 is located and the gauging button 106 comprise substantially parallel surfaces 108 which, when moved relatively vary the rate of fluid flow through the gauging orifice 104. In response to the variable restriction of the gauging orifice, the pressure in the bore 90 varies and the Bourdon tube 92 operates to vary the pointer 100 to give an indication of the size of the workpiece being gauged. As the pressure varies in the bore 90, there is also a variation in pressure of the Bourdon tube 38 which results in a movement thereof and a variation in the rate of discharge of fluid from the port 42 in the end thereof.

It will be apparent that a decrease in flow through the gauging port is accompanied by an increase in flow through the port 42. Accordingly, there is a substantially uniform rate of flow from the conduit 26 into the instrument. This serves to make the effect of the restrictor members 18 substantially uniform under all conditions of operation of the instrument.

The gauge head shown in Figure 8 is substantially identical with that shown in Figure 7 except that the gauging port 110 is in the end of the gauge head, and the gauging button 112 is supported to move axially toward and away from the port 110.

It will be apparent that the gauging head can take many forms, and so long as the gauging button serves to variably restrict the gauging port, the instrument will give a true indication.

When the instrument is originally set up, an initial measurement is made with precision measuring blocks or the like and adjustments made to bring the pointer to the mid-point on the dial. At the same time, the calibration of the instrument is checked by closing the gauging port completely. With the gauging port completely closed, the pointer will rise to the position marked "set point" on the dial. Thereafter, the operator need only close the gauging port in order to check the calibration of the instrument, and expensive auxiliary standards which normally accompany air gauges are eliminated.

It will be understood that this invention is susceptible to modification in order to adapt it to different usages and conditions and, accordingly, it is desired to comprehend such modifications within this invention as may fall within the scope of the appended claims.

I claim:

1. In an air gauge; a case having a back plate; a shank extending from said back plate; first and second Bourdon tubes carried on said back plate; a flow restricting port in the free end of said first Bourdon tube, a port control member carried on said back plate adapted to vary the resistance of said port as the said tube yields in response to increases in pressure therein, means for connecting the second of said tubes to actuate an indicating pointer; a gauging head extending laterally from said back plate, a variable work actuated port in said gauging head; means of variably restricting said work actuated port with the workpiece to be gauged; a fluid passage extending through said shank for supplying fluid gauging medium to said tubes and to said ports; and a fixed orifice in the flow passage determining the maximum rate of fluid flow to said work actuated port.

2. In an air gauge adapted for fixed or portable use; a back plate having a supporting shank extending therefrom; first and second concentric Bourdon tubes carried on said back plate; a port in the free end of one of said tubes; a tapered pin extending into said port and anchored to said back plate whereby the yielding of said tube due to pressure changes therein changes the effective area of said port; a pointer connected with the free end of the other of said tubes to be actuated thereby to sweep over a dial; a hollow gauge head extending laterally from said back plate and terminating in a port; means of variably restricting said port by a workpiece being gauged; a fluid channel extending through said shank to said hollow gauging head and also being connected with the fixed ends of said tubes with the first thereof connected to said passage adjacent the shank and the second thereof connected to the passage adjacent said gauge head; and a fixed orifice of predetermined size in said flow passage between said tubes.

3. In an air gauge; a gauge head having a workpiece variable port therein; a Bourdon tube type pressure indicating instrument supporting said gauge head and in fluid communication with said port; a fixed orifice in said instrument through which fluid passes to said port and to said tube; and means of supplying fluid at substantially constant pressure to said orifice comprising a second Bourdon tube substantially concentric with the first mentioned thereof, a port in the end of said second tube, and a tapered metering pin stationarily supported and extending into the end of the port in said tube for changing the effective area thereof when said tube yields due to a change in pressure therein.

4. In combination in an air gauge; a Bourdon tube type pressure indicating instrument having a frame; a gauge head detachably supported on said frame and comprising a workpiece variable port; passage means connecting said port with the inlet of said tube; a fixed orifice opening into said passage to supply gauging fluid to said port and tube; a second Bourdon tube substantially concentric with the first mentioned tube and having an aperture in its free end; a tapered pin extending into said aperture; a pivoted arm supporting said pin; means of supplying fluid at substantially constant pressure and simultaneously to said second tube and said fixed orifice; and means of adjusting said arm to vary the relative positions of said pin and aperture.

5. In combination in an air gauge; a Bourdon tube type pressure indicating instrument having a frame; means of detachably supporting a gauge head on said frame, said gauge head having a workpiece variable port; passage means connecting said port with the inlet of said tube; a fixed orifice opening into said passage means; a second Bourdon tube substantially concentric with the first mentioned tube and having an aperture in its free end; a tapered pin extending into said aperture for varying the effective area thereof when said second tube yields due to pressure changes therein; a casing mounted on said frame and enclosing said tubes and orifice; means of supplying fluid to the inlet of said second tube and through said orifice to said first tube and gauge head; and means operable from the outside of said casing for adjusting the relative position of said pin and aperture.

6. In combination in an air gauge; a Bourdon tube type pressure indicating instrument having a frame; means of detachably supporting a gauge head on said frame, said gauge head having a workpiece variable port; passage means connecting said port with the inlet of said tube; a fixed orifice opening into said passage means; a second Bourdon tube substantially concentric with the first mentioned tube and having an aperture in its free end; a tapered pin extending into said aperture for varying the effective area thereof when said second tube yields due to pressure changes therein; a casing mounted on said frame and enclosing said tubes and orifice; means of supplying fluid to the inlet of said second tube and through said orifice to said first tube and gauge head; means operable from the outside of said casing for adjusting the relative position of said pin and aperture; and stop means limiting the amount of said adjustment.

7. In an air gauge having a back plate; a gauge head having a port therein variable by the workpieces to be gauged; a pressure indicating instrument in fluid communication with said port; a fixed orifice opening into the inlet of said instrument; a chamber communicating with said orifice on the side opposite said instrument, a bypass port in said chamber, means movable relative to said bypass port to vary the resistance to air escape from said port directly with the pressure in said chamber; and fluid supply means for supplying fluid at substantially constant pressure to said chamber; said instrument and said chamber comprising first and second Bourdon tubes mounted on said back plate, the said plate having means to detachably receive said gauge head and also having a supporting shank thereon, and said shank being hollow and forming a passage means through which said fluid supply passes.

8. In an air gauge; a pair of concentrically arranged Bourdon tubes having fixed ends mounted on a common back plate; a fixed orifice, fluid conducting means connecting the fixed ends of said Bourdon tubes to said orifice; one of said tubes having an exhaust aperture in its outer free end; means on said back plate engaging said exhaust aperture to vary the effective area of said aperture as the said one tube yields to an increase in pressure therein, and decreases in effective area as the said one tube yields to a decrease in pressure therein; means for connecting the free end of the other of said tubes to an indicating pointer to cause said pointer to sweep over an indicating dial; means of supplying air at substantially constant pressure to the inlet of said one of said tubes; a port connecting the inlet of said other tube with exhaust; means of variably restricting said port by a workpiece to be gauged; and a common enclosure for said tubes having an aperture through which the indications of the said pointer may be observed.

9. In an air gauge apparatus; a source of air pressure supply, a first Bourdon tube having its fixed end connected to said pressure supply, a variable discharge aperture in the outer free end of said first Bourdon tube, and means cooperating with said discharge aperture to vary the discharge therefrom upon movement of said first mentioned Bourdon tube by pressure variations in said pressure supply, a master fixed orifice connected to said pressure supply, a second Bourdon tube connected to the discharge from said master orifice, an indicating gauge pointer mechanically actuated from said second Bourdon tube, a variable flow restrictor connected to the discharge from said master orifice, and means actuated by a work piece to be measured to vary said variable flow restrictor.

10. In an air gauge system, a passageway forming an air pressure supply, a first Bourdon tube having its fixed end connected to said passageway, and a discharge aperture in the outer free end of said Bourdon tube, a metering pin in said aperture, manual means for adjusting said metering pin to vary the initial discharge from said aperture, a master fixed orifice connected to said passageway, a second Bourdon tube having its fixed end connected to receive discharge from said master fixed orifice, a dial pointer actuated by said second Bourdon tube, a variable port connected to the discharge from said master fixed orifice and work contacting means coacting with said variable port to measure a workpiece.

11. In an air gauge; a case having a back plate; first and second substantially concentrically arranged Bourdon tubes anchored on said back plate; an indicating pointer connected with the free end of the first and inner of said tubes; an aperture in the free end of the second and outer of said tubes; a tapered pin extending into said aperture; a pivoted arm supporting said pin; means for adjusting the position of said arm from outside of said case to adjust the relative location of said pin and aperture; a fluid connection between the fixed ends of said tubes including a fixed orifice of predetermined size; a supporting shank on said back plate having a fluid supply passage therethrough communicating with the inlet of said second tube; and a gauge head detachably mounted on said back plate and including a workpiece variable discharge port hydraulically connected to the inlet of said first tube.

12. In an air gauge; a pressure indicating instrument; means associated with said instrument for supporting a gauge head having a workpiece variable port therein; passage means for connecting the said port with the inlet of said instrument; a fixed orifice opening into said passage; a Bourdon tube having its fixed end connected to the input side of said orifice from said instrument; means for supplying air at substantially constant pressure to the input side of said orifice, a variable flow restrictor including an aperture in the end of said tube opening to the atmosphere; a tapered valve member extending into said aperture; means to move said aperture and valve member relatively in response to changes of pressure in said chamber; and means continuously urging said valve member into engagement with one side of said aperture.

13. In an air gauge; a pressure indicating instrument having a back plate; means of detachably supporting a gauge head having a workpiece variable port therein on said instrument; passage means for connecting the said port with the air inlet of said instrument; a fixed orifice opening into said passage means; means for supplying a compressible fluid gauging medium to the inlet side of said orifice at substantially constant pressure; a Bourdon tube having its fixed end opening into said passage; a bypass port in said tube opening to the atmosphere; a tapered metering pin mounted on said back plate extending into said bypass port; said port and pin forming a bleed to atmosphere from said passage that varies in effective area directly as the pressure in said passage; a torsion spring continuously urging said pin into engagement with one side of said port; and means of effecting an initial adjustment of the relative position of said pin and port.

FREDERICK L. RUPLEY.

REFERENCES CITED

The following references are of record in the file of this patent:

UNITED STATES PATENTS

| Number | Name | Date |
|---|---|---|
| 1,697,344 | Campbell | Jan. 1, 1929 |
| 2,010,144 | Dundon | Aug. 6, 1935 |
| 2,187,662 | Pigott | Jan. 16, 1940 |
| 2,370,219 | Aller | Feb. 27, 1945 |
| 2,397,494 | Kuppersmith | Apr. 2, 1946 |
| 2,457,401 | Rupley | Dec. 28, 1948 |

FOREIGN PATENTS

| Number | Country | Date |
|---|---|---|
| 364,362 | Germany | Nov. 23, 1922 |